J. R. GILLELAND.
HOOF TRIMMING MACHINE.
APPLICATION FILED AUG. 19, 1918.
1,304,761. Patented May 27, 1919.
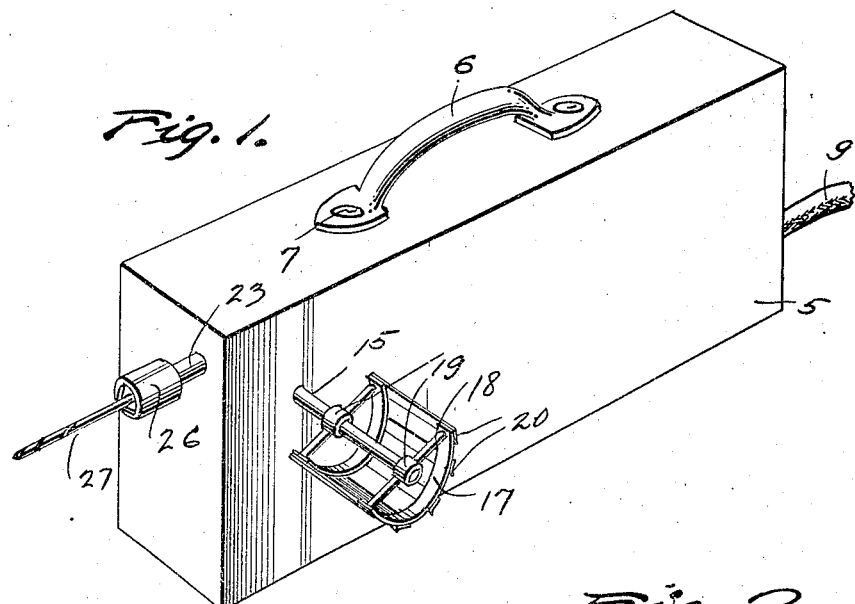
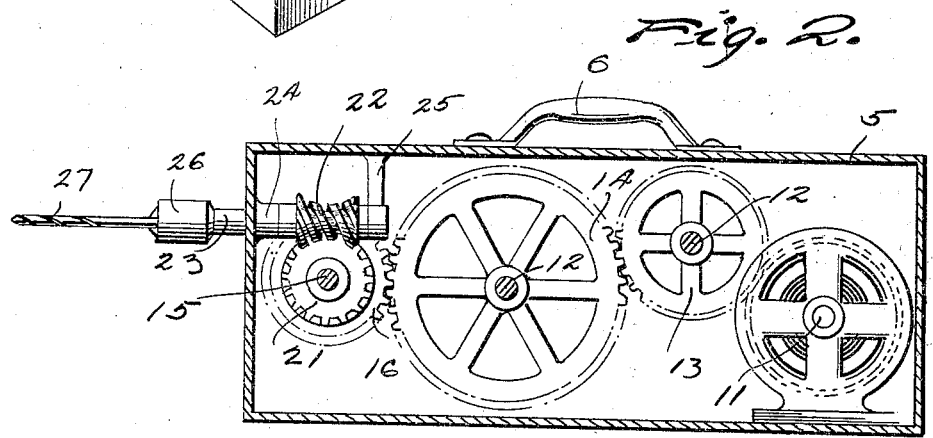
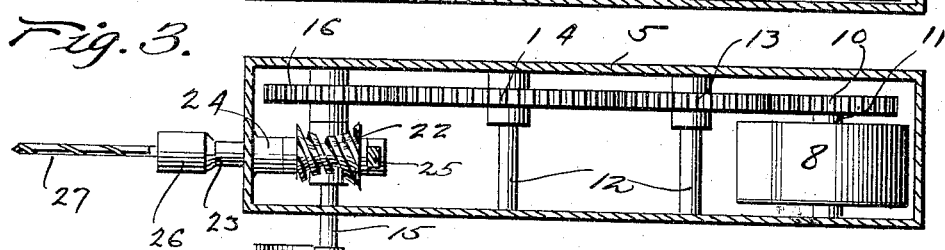
WITNESSES
Inventor
James R. Gilleland
By Richard Blewer
Attorney

UNITED STATES PATENT OFFICE.

JAMES ROBERT GILLELAND, OF BALTIMORE, MARYLAND.

HOOF-TRIMMING MACHINE.

1,304,761.  Specification of Letters Patent.  Patented May 27, 1919.

Application filed August 19, 1918. Serial No. 250,558.

*To all whom it may concern:*

Be it known that I, JAMES R. GILLELAND, a citizen of the United States, residing at Baltimore, in the State of Maryland, have invented certain new and useful Improvements in Hoof-Trimming Machines, of which the following is a specification.

This invention is a hoof-trimming machine and has for its principal object the production of an electrically operated device of this nature which is easily transportable and movable when in use for facilitating the proper operation of the same.

Another object of this invention is the production of a hoof-trimming machine wherein a rotary chipper is provided and is driven by an operating mechanism carried within the casing, although the chipper is carried exteriorly of the casing, for facilitating the placing of the chipper in engagement with a hoof when the device is in operation.

Another object of this invention is the production of a hoof-trimming machine which includes a drill operated by the same mechanism which drives the chipper.

One practical form of construction and assembly of the present invention will be hereinafter described, and is illustrated in the drawing in which—

Figure 1 is a detail perspective view of the hoof-trimming machine;

Fig. 2 is a central longitudinal section through the casing, the operating elements being shown in elevation; and Fig. 3 is a central horizontal section through the casing, showing the gears in top plan.

In the preferred embodiment of the present invention, 5 indicates a casing, which is substantially rectangular, although of course this casing may be of any desired shape or size. The handle 6 is fixed as indicated at 7 upon the upper portion of the casing 5 and thus allows the casing to be easily held in the correct position when in use.

A motor 8 is carried within the casing 5 and may be supplied with electricity by the connection of the cord 9 thereto and also to a suitable source of supply not shown. This motor 8 has a gear 10 upon its armature shaft 11, as shown in Fig. 3.

Horizontally arranged shafts 12 are carried by the casing 5 and have gears 13 and 14 mounted thereon and meshing with each other. The gear 13 meshes with the gear 10 of the armature shaft 11 of the motor 8 and for this reason when the motor is in operation, it will cause the gears 10, 13 and 14 to be driven.

The shaft 15 is rotatably mounted upon the casing 5 and has a gear 16 keyed thereon, it being noted that the gear 16 meshes with the gear 14. Accordingly if the gears are in operation the shaft 15 will be rotated. This shaft 15 has one end projecting beyond one side of the casing 5, as illustrated in Figs. 1 and 3.

The chipper comprises a pair of semicircular rims 17 connected by the oppositely extending spokes 18 to collars 19. It will be noted that one collar and two spokes are provided for each semicircular rim 17, as illustrated in Fig. 1. The collars 19 are fixed upon the shaft 15 to rotate in unison therewith, and it will be noted that the collars 19 are spaced apart. The blades 20 are also fixed upon the rims 17 in spaced relation with respect to each other, and it will be noted that the blades 20 connect the two semicircular rims 17 together. Thus the chipper is substantially semicylindrical and is carried externally of the casing 5. As the shaft 15 is rotated, it is obvious the chipper will be rotated at a great rate of speed and for this reason when placed in engagement with the hoof of a horse the blades will chip the desired amount and portion of the hoof away very rapidly and easily without danger of injury to the hoof.

The pinion 21 is keyed upon the shaft 15 within the casing 5, as shown in Fig. 2, and meshes with the worm 22. This worm 22 is mounted upon a shaft 23 carried by a journal 24 and a journal bracket 25. A grip member 26 is carried upon the shaft 23 and carries the drill 27. Therefore when the shaft 15 is rotated, rotary movement will be imparted through the worm 22 to the shaft 23 and thus cause the drill 27 to be rotated. Accordingly the drill may be used for any desired purpose in connection with horseshoeing, wheelwrighting, and all sorts of blacksmiths' work, or in fact any other work where the drill may be desired and where a portable comparatively light structure is to be employed for accomplishing such work.

When the present invention is in operation the motor is started by the usual electrical current and consequently will cause rotary motion to be imparted to the shaft 15 by simultaneous rotation of the train of gears as shown in Fig. 3.

The rotary chipper and the drill are carried exteriorly of the casing 5 and although the gears are shielded from injury or from injuring the operator or elements which may engage the same, it is obvious the operating elements are in engaging position for use. The chipper and drill are simultaneously rotated and by the placing of either element in engagement with the article to be operated upon, it is obvious they will perform their respective functions.

It will therefore be noted from the foregoing description that a comparatively light structure is presented and that the chipper and drill may be efficiently operated with a mechanism which is entirely shielded from injury or from injuring elements engaging the same and protected from the weather.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a driving means including a shaft, and a semicylindrical chipper mounted upon said shaft to rotate in unison therewith.

2. In a device of the class described, the combination of a driving means including a shaft, semicircular rims, means for fixing said rims upon said shaft, and blades connected to each of said rims and spanning the space therebetween, said blades being substantially parallel to each other, whereby when said shaft is rotated, the blades will be moved in a circle to chip an article in the path of movement thereof.

In testimony whereof I affix my signature in presence of two witnesses.

JAMES ROBERT GILLELAND.

Witnesses:
M. ALPHONS REYMANN,
Mrs. ROSETTA THELMA GILLELAND.

Copies of this patent may be obtained for five cents each, by addressing the "Commissioner of Patents, Washington, D. C."